United States Patent [19]

Sorber et al.

[11] 4,289,995

[45] Sep. 15, 1981

[54] ELECTRIC DOOR OPERATOR WITH SLIP CLUTCH AND DYNAMIC BRAKING

[75] Inventors: Robert E. Sorber; James A. Gallion, both of Charlotte, N.C.

[73] Assignee: Keane Monroe Corporation, Monroe, N.C.

[21] Appl. No.: 62,765

[22] Filed: Aug. 1, 1979

[51] Int. Cl.³ .................................... H02K 7/10

[52] U.S. Cl. .................................... 318/9; 318/262; 318/266; 318/282; 318/286; 318/369; 318/436; 49/334; 49/28

[58] Field of Search .................... 318/9, 10, 14, 159, 318/259, 262, 265, 266, 282, 285, 286, 369, 379, 380, 436, 443, 467, 468; 49/28, 334, 340

[56] References Cited

U.S. PATENT DOCUMENTS 2,170,014 8/1939 Ellis .................................... 318/285

4,045,914 9/1977 Catlett .................................... 49/334

*Primary Examiner*—J. V. Truhe

*Assistant Examiner*—John W. Redman

*Attorney, Agent, or Firm*—Richards, Shefte & Pinckney

[57] ABSTRACT

An automatic door closer providing for use as a light duty door opener and having a slip clutch for protecting the electric gear drive power unit from damage due to overspeeding on excess loads applied by overriding manual door operation. Zener diodes across the power supply to the electric drive motor effectively throw a heavy electrical load on the motor and cause the clutch to slip if the motor is sufficiently oversped and caused to act as a higher voltage bucking generator, as by manually forcing the door substantially faster in the direction in which it is being driven. A direct current motor is used at considerably lower than its rated voltage so that electrical power may be safely applied continuously for holding the door closed with the motor stalled, and without the clutch slipping, with the clutch set to slip only when the force applied thereto is significantly higher than the force required to stall the motor yet safe for the drive unit. When the internal friction of the gear drive is added to the stalling force upon manually pushing open the closed door, the clutch is caused to slip and the door may thus be forcefully opened without damage to the drive unit. A switch actuated by the drive unit operating linkage on the output side of the clutch simultaneously removes power from the motor and connects a heavy electrical load thereto when the drive unit has driven the opening door to a predetermined stopping position. The motor then acts as a generator under the heavy load to resist farther motor rotation sufficiently so that the inertia force of the opening door causes the clutch to slip until the inertia force of the door is dissipated. A bypass diode permits automatic time-delayed application of closing power to the motor by bypassing the open switch which has removed opening power from the motor.

19 Claims, 7 Drawing Figures

ELECTRIC DOOR OPERATOR WITH SLIP CLUTCH AND DYNAMIC BRAKING

BACKGROUND OF THE INVENTION

Light duty automatic door closers are well known and are usually spring biased to hold a door closed while allowing it to be manually opened as desired against the bias of the spring, which immediately acts to reclose the door when the manual opening force is released. Powered automatic door operators, on the other hand, are usually operated automatically at high speed ahead of traffic by traffic sensing controls, and have required heavy duty drives and relatively complex controls for timely operation and safety.

There is a felt need for a powered light duty door operator which falls between the relatively inexpensive aforementioned spring biased operators and the relatively expensive automatic high speed powered operators also aforementioned. Such a powered light duty operator would be intended for operation similar to the spring biased operator, i.e., it would be manually opened by traffic passing through, and would automatically close behind the traffic. However, such a powered light duty operator would also have the ability to both open and close the door under power controlled by suitable electrical switches, particularly for use by handicapped people in wheelchairs, and the door would be operated very slowly under power as compared to the usual high speed automatic powered door operator.

A prior art light duty powered door operator recently introduced by the Stanley Works, Farmington, Conn., under the trade name "Silent Swing" has a stallable alternating current electrical gear motor drive for selectively driving a door in opening and closing directions to full open and full closed positions with resilient damping at each end position. Power remains on the motor at full open and closed positions, consuming about 40 watts of electrical power. The door may be opened or closed against the drive, or the drive may be speeded up or stalled by manually assisting or resisting the door. Since the motor drives the door directly through appropriate gears and linkage, the motor and gear drive must be relatively heavy duty apparatus in order to stand the abuse when the door is abruptly manually stopped, reversed in direction, or drastically oversped. There is no inherent limit to such abuse except manual strength limitations, and due to the high gear ratios involved, very high motor speeds and inertia forces may be generated by fast traffic bumping the door. This operator is intended to be controlled by a simple double-pole-double-throw toggle switch for relatively slow operation (Approximately 3.5 seconds for full travel) thereby probably assuring that normal traffic would just push the door open against the mechanism at a much faster and potentially damaging rate (as in the aforementioned spring biased door closer), leaving the door operator to close the door only. Probably handicapped persons, whether in wheelchairs or afoot, would be the only traffic using the operator to open the door.

An earlier Stanley Works powered door operator employed a slip clutch between a power drive element and an operating linkage, but the drive element was powered only to fixed limits of its own movement, and clutch slippage necessitated resetting the clutch so that the door would not remain partially open until a subsequent operation. Such an arrangement was presumably intended to be for emergency use only, as in case of fire or power failure, or a person caught by a closing or opening door.

In contrast, the present invention, in its preferred embodiment, is powered by a very small, permanent magnet type, direct current motor of about 0.025 rated horsepower. The motor may be stalled for indefinite periods without drawing excessive current or overheating since it is operated at greatly reduced voltage and at about its full load rated current when stalled. Its stalled torque is therefore relatively low while running torque decreases generally nearly linearly from stall torque to full no-load speed. To generate the force required for even relatively slow door operation (about 6 seconds for full travel), five stages of gear reduction (a ratio of about 500:1) are employed between the motor and the output shaft of the drive unit. This allows use of a relatively small and inexpensive commercially available standard drive unit which may be controlled readily with equally small and relatively inexpensive solid state electronics. These electronic controls in turn allow use of the small inexpensive drive unit by making it possible to protect it from physical abuse through use of a slip clutch, as well as providing advantageous operational characteristics and capabilities which have not been technically or commercially practical with any known prior art devices. The preferred embodiment of the present invention provides for almost negligible power consumption, operation similar to a spring biased door closer for manual operation, switch controlled powered door opening and closing when desired, and manual overriding operation either with or against the power drive without danger of excessive overspeeding or shock-loading the drive unit destructively. The present door operator is economically practical as an improved substitute for the conventional spring-biased door closer in view of government-mandated requirements for power operation of such doors to accommodate the handicapped.

SUMMARY OF THE INVENTION

Briefly described, the electrically driven door operator of the present invention includes a door operating linkage, electrically powered drive means connected to the linkage for applying an operating force to the door therethrough and capable of being continuously stalled while applying the operating force at the operating voltage of the drive means, and further includes slip clutch means connecting the drive means and the operating linkage for transmitting the operating force therebetween and having a resistance to slipping greater than the operating force of the drive means when stalled whereby the door will be maintained against a stationary obstruction by the application of the operating force with the drive means being continuously stalled by the obstruction without slipping of the clutch means.

The door operator of the present invention is characterized further in that the slip clutch means has a capability for slipping to allow movement of the door in the direction opposite the application of the operating force with the drive means continuously stalled upon application to the door of a counterforce sufficient to overcome the clutch means resistance. Furthermore, the drive means is capable upon application of an overriding force of being oversped to an allowable limit at which the drive means develops resistance to overspeeding sufficient to cause the clutch means to slip.

Preferably, in a door operator according to the present invention, the resistance to overspeeding is developed by means for electrically loading the drive means for developing therein the resistance to overspeeding. Preferably, the door operator includes further means actuated upon the door being opened to a predetermined location for removing electrical power from the drive means for electrically loading the drive means for developing resistive force therein for overcoming the resistance to slipping of the clutch means by application of the inertial force of the door being opened to the clutch means against the resistive force, thereby decelerating the opening of the door by dissipation of the inertial force in the clutch means.

In the preferred embodiment of the present invention, the drive means is powered by a permanent magnet type direct current electric motor. Furthermore, the slip clutch means has surfaces for slipping including material containing polytetraflouroethylene. The means for electrically loading the drive means for developing therein the resistance to overspeeding includes a Zener diode connected to the motor. The means for removing electrical power from the drive means and electrically loading the drive means for developing resistive force therein includes a cam-actuated limit switch, normally closed contacts therein for opening and disconnecting the electrical power from the motor upon actuation of the switch, a loading resistor, and normally open contacts in the switch for closing and connecting the loading resistor to the motor. A bypass diode connected in parallel with the normally closed contacts permits electrical power to flow through the bypass diode to the direct current motor for closing the door from the predetermined location while the switch is actuated and the normally closed contacts are thereby opened. A blocking diode is connected in series with the loading resistor for blocking the electrical power for closing the door from the predetermined location from the loading resistor while the switch is actuated and the normally open contacts are thereby closed. Automatic means is provided for reversing the power to the direct current motor after a time delay period allowing for the door to be opened to the predetermined location and the power to be disconnected from the motor by the actuation of the limit switch, the reversing of the power causing the door to be closed.

DESCRIPTION OF THE PREFERRED EMBODIMENT

The electrically powered door operator of the present invention is preferably intended for application to a light weight interior or residential exterior door, and may be located on the door frame or on the door itself, and may be on the face of the door or frame toward which the door opens or vice versa.

Figure 1:
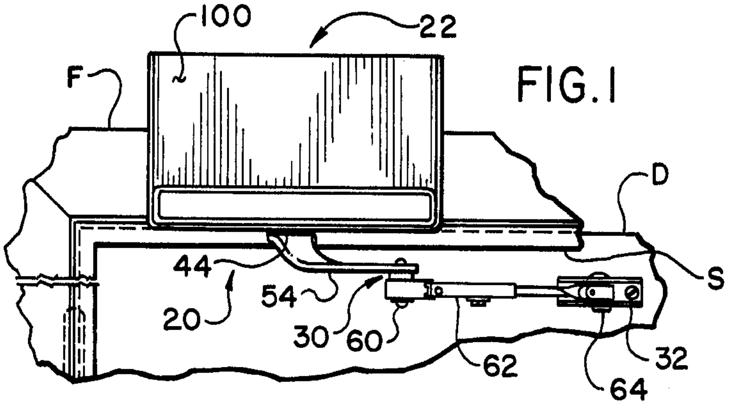
FIG. 1 is a front elevational view of a light duty door operator according to the present invention mounted on the near side of a door frame with the door opening away from the viewer.
Figure 2:
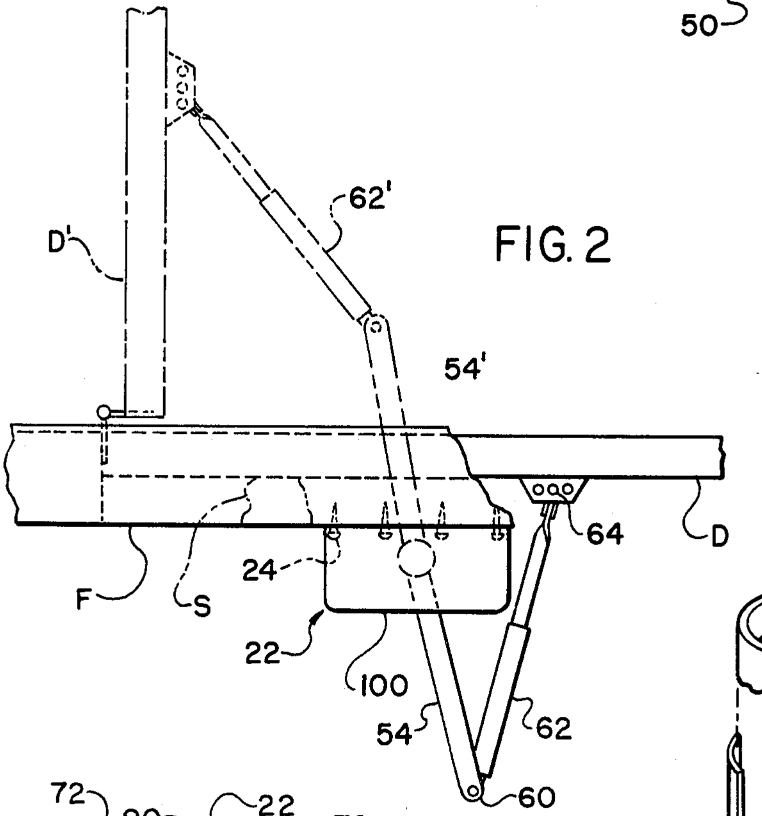
FIG. 2 is a plan view of the operator, door frame, and door of FIG. 1, showing the door and operating linkage in both closed and full-open positions.
Figure 3:
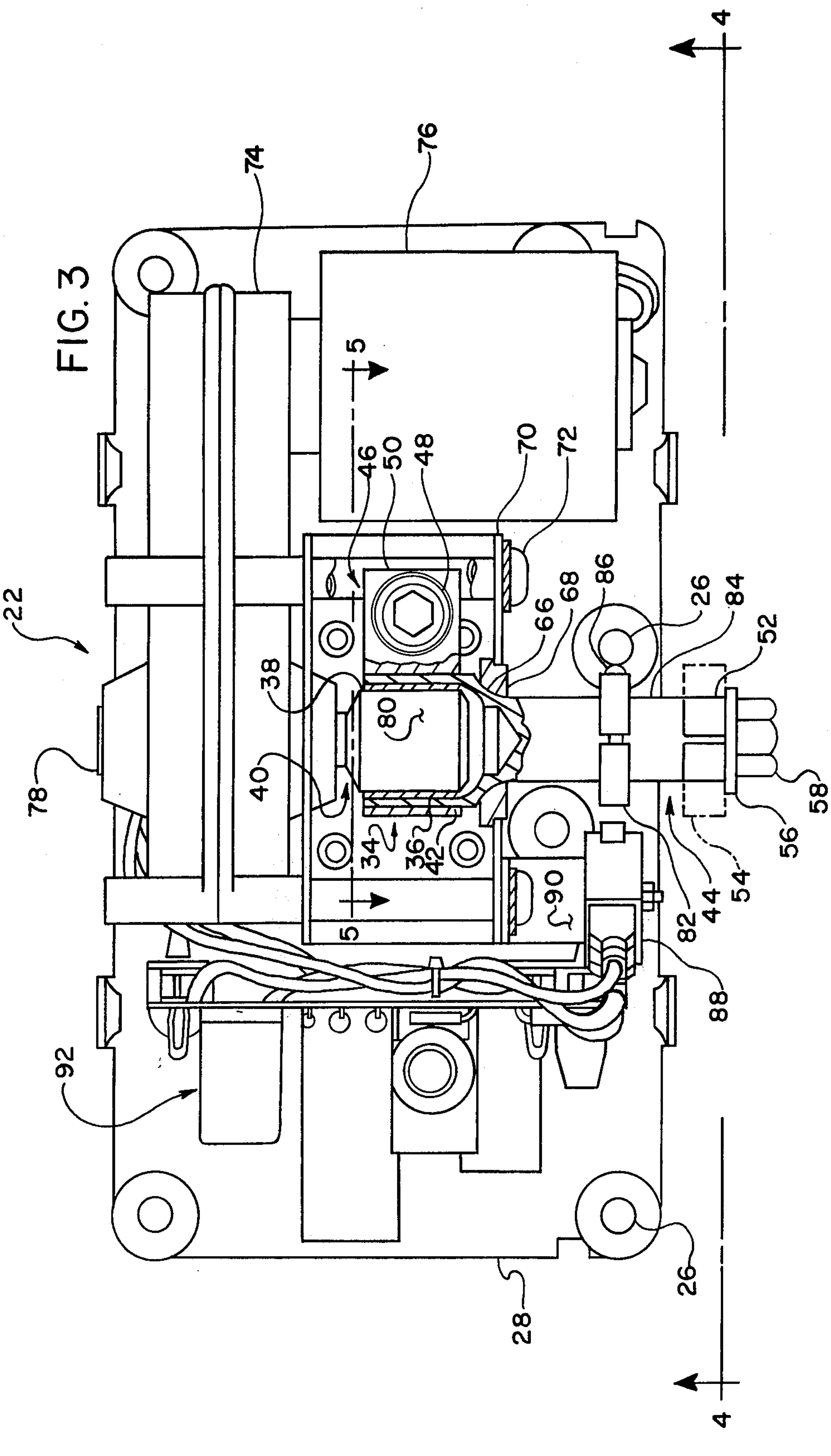
FIG. 3 is an enlarged front elevational view of the operator drive element as shown in FIG. 1 except with the cover removed and a portion of the slip clutch element broken out to show its interior construction.

The electrically driven door operator 20 of the preferred embodiment is typically connected between a door frame F and a hinged or pivoted swinging door D. In a typical installation as shown in FIGS. 1 and 2, the electrically powered drive means 22 of the operator 20 is conventionally fastened to the door frame F by the screws 24 extending through mounting holes 26 in the base plate 28 (see FIG. 3) of the drive means 22 into the frame F. The operator 20 includes a door operating linkage 30 for applying operating force therethrough to the door D. The linkage 30 is connected to the door D by the mounting shoe 32, and to the drive means 22 by a slip clutch 34 (as shown in FIG. 3) for transmitting the operating force between the drive means 22 and the linkage 30.

Figure 5:
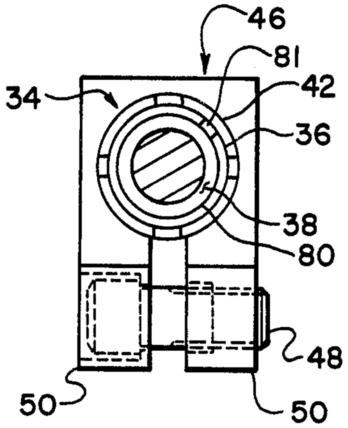
FIG. 5 is a plan view of the slip clutch as taken along the line 5—5 in FIG. 3.

The clutch 34 is formed by a split bushing 36 clamped around the enlarged extending end 38 of the output shaft 40 of the drive means 22 and within a split yoke 42 formed on one end of an operating shaft 44. The yoke 42 is clamped around the bushing 36 and the shaft end 38 by a split clamp 46 which encircles the yoke 42 and whose clamping tightness may be adjusted by turning the adjusting screw 48 connecting the arms 50 of the clamp 46 as shown in FIG. 5. The torque or force required to cause the clutch 34 to slip, or resistance to slipping, may thus be adjusted by suitable tightening of the screw 48 to be greater than the operating force of the drive means 22 when stalled, and the operating shaft 44 forms an extension of the output shaft 40 of the drive means 22 as well as part of the operating linkage 30.

The shaft 44 has a cross-sectionally square portion 52 at the end thereof opposite the yoke 42 for attachment thereat of an operating arm 54 having a mating opening to the square portion 52 therein by a washer 56 and a screw 58 which is engaged with an axially threaded hole in the square end of the shaft 44. The extending end of the arm 54 has a suitable hole therein for acceptance of a pin 60 for pivotable connection to one end of an adjustable forearm 62 which at its other end is pivotably connected in turn to the mounting shoe 32 by a second pin 64. The shaft 44 has an annular shoulder 66 below the yoke 42, and a flanged shaft collar 68 set into an opening in a drive mount bracket 70 bears against the shoulder 66 to provide further support for the shaft 44 and to prevent overloading the output shaft 40 of the drive 22. The drive means 22 is attached to the drive mount bracket 70 by long screws 72, and the bracket 70 is attached to the base plate 28 for support from a door D or door frame F as aforesaid.

The drive means 22 of the preferred embodiment is a relatively inexpensive commercially available gearmotor including a split drive housing 74 having therein five stages of reduction gearing (not shown) with an overall ratio of 514:1 and driven or powered by a small direct current permanent magnet electric motor 76. The motor 76 is commercially rated to run on one ampere at 24 volts at a speed of about 3100 rpm to produce 100 inch pounds torque at 6 rpm at the output shaft 40. The motor 76 is reversible by reversing polarity of the electric current supplied thereto; and since the operating voltage applied thereto is limited, whereby the current supplied is limited to one ampere, it is capable of being stalled indefinitely and continuously without undue heat buildup.

The drive means 22 has a hollow bore final drive shaft 78 into which the shank of the specially formed output shaft 40 is conventionally inserted and locked. The enlarged end 38 of the shaft 40 has a cylindrical surface 80 which has been finished to a surface roughness of about 16 microinches, followed by chrome plating.

For smooth, reliable, and relatively wearfree performance of the slip clutch 34, the split bushing 36 is formed by cutting a lengthwise slot 81 in a hollow cylindrical DU® bearing bushing such as is commercially available from Garlock Bearings Inc. The body of a DU® bushing is formed from steel which is lined on the inner cylindrical surface thereof with a 0.010 inch layer of sintered porous bronze impregnated with a homogeneous polytetraflouroethylene (PTFE)-lead mixture which also forms a 0.001 inch layer overlying and lining the inner cylindrical surface of the porous bronze layer.

The exact construction of the bushing 36 is important in that it permits a running-in process in which the enlarged shaft end 38 is turned within the bushing 36 while the bushing is clamped tightly to the shaft. The friction between the slipping shaft end 38 and bushing 36 generates heat and causes a layer of the PTFE-lead mixture about 0.0005 inch thick to transfer to and line the surface 80 of the shaft end 38 and become physically bonded thereto. Once the PTFE-lead layer has formed on the surface 80, there is very little wear between the mating PTFE layers on the surface 80 and the inside of the bushing 36 during the type of intermittent slipping which occurs in the slip clutch 34 of the present invention—thus, once the running-in process is complete, the slit clamp 46 may be adjusted so that the clutch 34 slips at a predetermined desired torque value, such as 90 inch-pounds, which is slightly less than the commercially rated torque of the drive means 22 at full voltage, thereby assuring that the drive means 22 can not be damaged by overtorquing.

Accelerated testing has indicated that the clutch may be expected to slip at that torque value over an extended period of years of normal service in the door operator 20. Other clutch facing materials tested have functioned satisfactorily so far as the slip function is concerned, but wore relatively quickly, resulting in changing slipping torque values which would be unsatisfactory for long-term service in a door operator according to the present invention. The PTFE material has an additional advantage in that it is generally free of "stick-slip" frictional properties, thereby avoiding any chattering, jumping, or other disadvantageous effects.

A split cam 82 clamped to the cylindrical midportion 84 of the operating shaft 44 by the clamping screw 86 may be adjustably located relative to the shaft 44, the operating linkage 30, and thereby the door D for actuating a limit switch 88 at any desired position of the door D. The switch 88 is attached to a switch bracket 90 which is in turn attached to the drive mount bracket 70 for suitable predetermined placement of the switch 88.

A circuit board 92 provides all the electrical and electronic elements necessary for the power supply, logic, and power application and control circuits for the door operator 20, with the exception of a power transformer 94, the limit switch 88 with a bypass diode 96 connected directly across its normally closed contacts, and a manual actuator switch or switches 98. The circuit board 92 is mounted on the base plate 28 of the drive means 22 and is enclosed by a cover 100 (removably attached to the base plage 28) which, with the base plate 28, completely enclosed the drive means 22, leaving only the operating linkage 30, the transformer 94, and the manual switch 98 of the operator 20 unenclosed.

Figure 4:
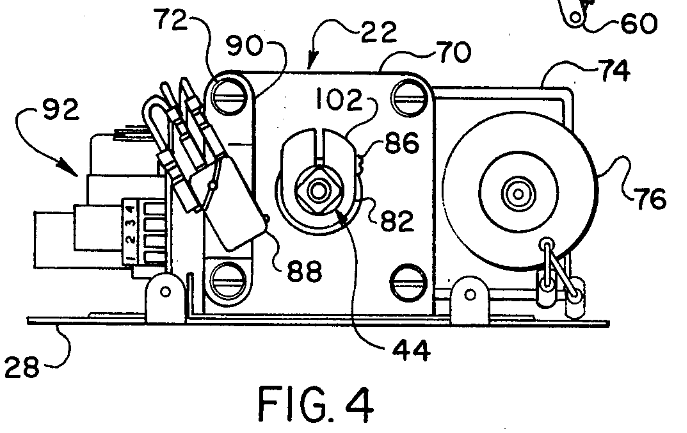
FIG. 4 is a somewhat enlarged bottom view of the operator as taken along the line 4—4 in FIG. 3.
Figure 6:
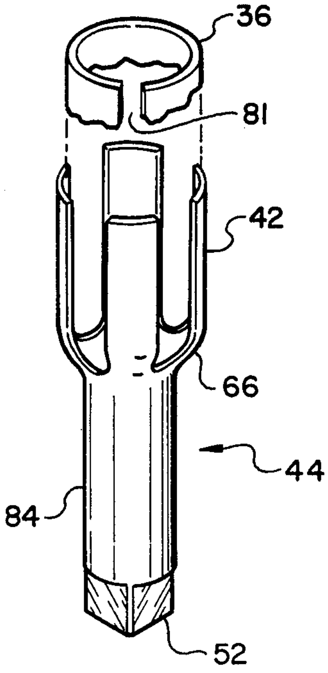
FIG. 6 is an exploded perspective view of the split clutch yoke on the operating shaft and of the split teflon-lined bushing normally fitted therewithin.

In the typical application shown in FIGS. 1 and 2, the drive means 22 and the mounting shoe 32 are fastened to the frame F and the door D respectively at empirically predetermined locations widthwise of the frame and door, and the adjustable forearm 62 is adjusted to an empirically predetermined length, resulting in the general configuration shown in FIGS. 2, where the operating arm 54 makes an angle of about 30° with the forearm 62 when the door D is closed against the stationary stop or obstruction S attached to the frame F, and of about 150° when the door D is opened 90° (as indicated in broken lines at the characters D', 54', and 62'). The split cam 82 as shown in FIG. 4 is adjusted so that upon opening the door D to the 90° position the lobe 102 off the cam 82 just actuates the limit switch 88 (the cam 82 turns clockwise in FIG. 4 as the door is opened), whereupon the clamping screw 86 is tightened to lock the adjustment. The slip clutch 34 allows the door D to be readily positioned as needed for checking the configuration and making the above adjustment.

Figure 7:
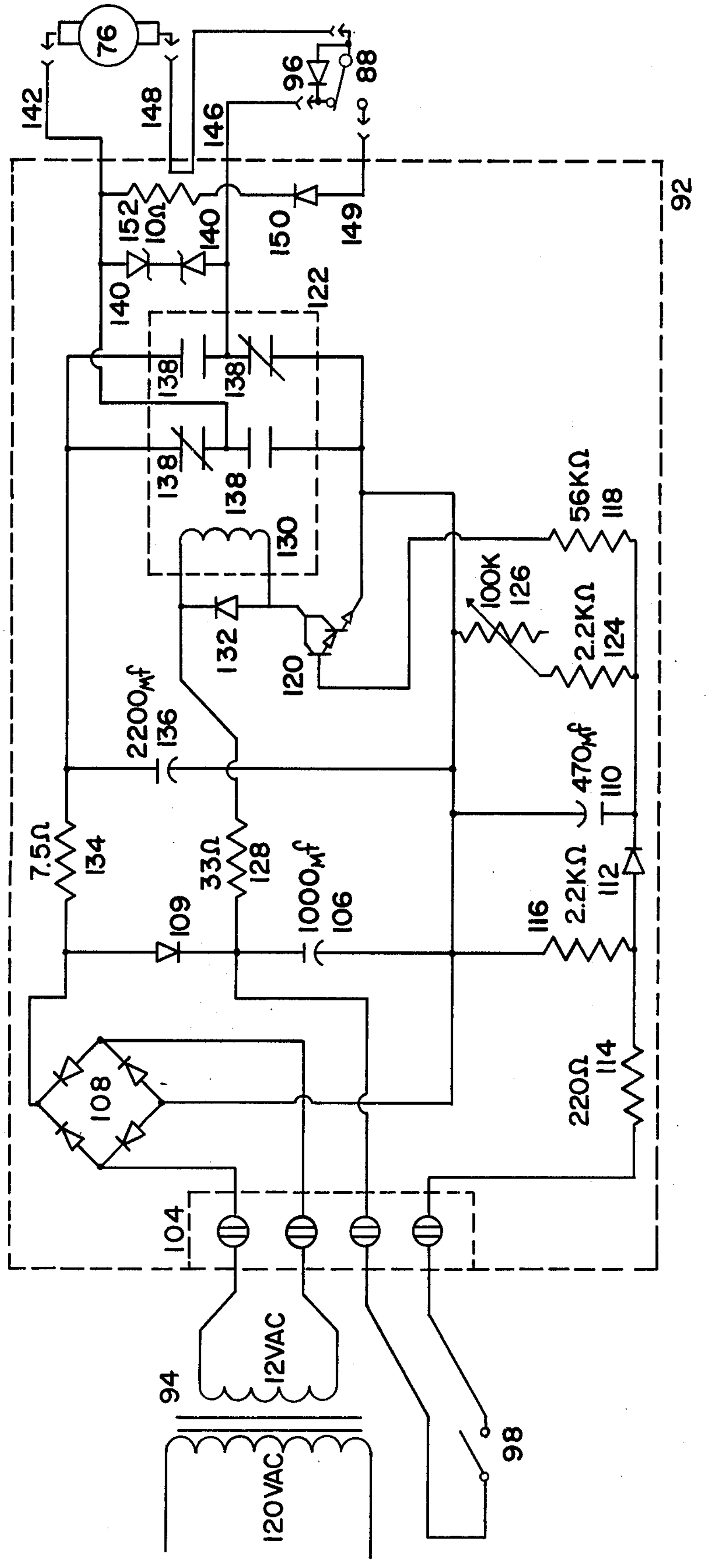
FIG. 7 is a schematic circuit diagram of the power supply, logic, and power application and control circuits of the operator.

The electrical circuits are diagrammed schematically in FIG. 7, where the power transformer 94 is shown with a typical 120 volt AC primary and 12 volt AC secondary. The transformer 94 is typically mounted at some convenient location for connection to 120 volt AC, so that only 12 volt AC wiring need be extended to the door opertor 20 and connected to the terminal strip 104 located on the circuit board 92. The manual actuator switch 98 may be any normally open momentary contact switch and is typically mounted on the wall three to eight feet minimum from the door D and accessible to a wheelchair occupant. The switch 98 carries only 12 volt DC and less than 100 milliamps of current. Any number of switches 98 may be connected in parallel to allow actuation of the door operator 20 from any desirable location.

The electrical circuits are best described in connection with their functions, and this description begins with the door D closed and the control circuits connected to power. The logic power supply smoothing capacitor 106 is charge by rectifying the 12 volts AC from the transformer 94 through the rectifier bridge 108. A diode 109 passes current to the capacitor 106, but prevents discharge thereof through the motor 76. The approximately 14 volts DC achieved across the capacitor 106 does not discharge significantly as long as the control is connected to power.

Initially there is no voltage across the timer capacitor 110. When the actuator switch 98 is closed, the 14 volts DC is connected to and charges the timer capacitor 110 through the diode 112 and the limiting resistor 114 which limits the charging current to prevent damage to the switch 98. The resistor 116 bypasses any leakage through the actuator switch 98 circuit so that the circuit is not excessively sensitive. The diode 112 prevents discharge of the capacitor 110 through the resistor 116. When the capacitor 110 is charged, current flows through the resistor 118 to the base of the Darlington transistor 120. This current energizes the double-pole-double-throw relay 122 which reverses the voltage applied to the motor 76 and causes the door D to open. The relay 122 will remain energized during a time delay period until the voltage across the capacitor 110 decays to less than about 1 to 2 volts, at which time the transistor 120 will cease to conduct, and the relay 122 will be de-energized to automatically reverse the state of its contacts and the power applied to the motor 76. The capacitor 110 discharges through two paths, the resistor 110 and the series combination of the fixed resistor 124 and the variable resistor 126. The adjustment of the resistor 126 from 0 to 100,000 ohms adjusts the time delay from approximately four seconds to one minute. Obviously, the time delay period begins when the actuator switch 98 is released, not when it is first closed. The resistor 128 reduces the voltage across the coil 130 of the relay 122 to about 12 volts DC. The diode 132 prevents inductive voltage spikes generated in the coil 130 of the relay 122 from damaging the transistor 120.

The rectifier bridge 108 converts the transformer 94 output to DC. As noted before, part of the DC current passes through the diode 109 to energize the logic portion of the control circuit, but most of the output of the bridge 108 powers the motor 76. The resistor 134 limits the current to the motor 76 to about one ampere at 4 volts to prevent it from burning out. The capacitor 136 smooths the voltage applied to the motor 76 in order to prevent audible 60 Hz hum, especially when the motor 76 is stalled.

The contacts 138 of the relay 122 constitute a reversing switch. The Zener diodes 140 protect the capacitor 136 and prevent the motor 76 from over speeding. When the relay 122 is energized, the lead 142 from the motor 76 is connected to the negative DC side of the bridge 108 and the lead 146 to the limit switch 88 is connected to positive DC. The upper contact of the limit switch 88 is in the normally closed condition shown in FIG. 7 when the door D is closed and therefore conducts the positive voltage to the lead 148 to the motor 76. This energizes the motor 76 and causes the door D to open.

When the door D reaches the fully open or other predetermined location, the limit switch 88 is actuated by the cam 82 to open its upper normally closed contact to disconnect and remove electrical power from the motor 76 and electrically dynamically brake or load the motor 76, which now acts as a generator, by passing the relatively heavy current generated by the motor 76 through the lower normally open contact of the switch 88 for connection to the lead 149, the diode 150, and the braking or loading resistor 152. The resistor 152 limits the braking current to prevent excessive internal inertial torque force being generated in the drive means 22, yet generating sufficient resistive torque force to overcome the clutch resistance to slipping and cause the clutch 34 to slip thereagainst while dissipating inertia force of the opening door in the clutch 34 and thereby decelerating its opening.

When the relay 122 is de-energized, at the end of the time delay period, the lead 142 becomes positive and the lead 146 becomes negative. In this current direction, the bypass diode 96 connected in parallel with the still open (but normally closed) upper contacts of the limit switch 88 conducts and permits current or power to flow therethrough to by-pass the limit switch 88 to cause the motor 76 to close the door D from the aforesaid predetermined location. The diode 150 prevents or blocks current from passing through the braking resistor 152 connected in series therewith at this time, and once the door D has been closed slightly the switch 88 reverts to its normal unactuated state and the diodes 150 and 96 are inactive until the switch 88 is again actuated. Power remains on the motor 76 as long as the door D is closed so that disturbances such as drafts will not open it, and the door D will be maintained against the stop S by the application of the operating force of the drive means 22 thereto, with the drive means 22 being continuously stalled without slipping of the clutch 34.

If, while the door D is being opened or closed under power, a pedestrian "helps" by applying an overriding force and pushing the door faster than its normal powered speed, the motor 76 will tend to be oversped. Excessively high motor speeds may cause gear or motor failures. The Zener diodes 140 limit the motor speed to a safely allowable limit. The motor 76 always acts as a generator to develop a counter voltage which is proportional to the speed at which it is turning. The polarity of this voltage is the same as that applied and such that, if it is permitted to drive a current, the motor 76 will slow down. As the motor is driven faster, the voltage will rise above the applied voltage until it reaches the Zener diode breakdown voltage, 22 volts. At this point, current is driven through the Zener diodes, tending to slow the motor as by dynamic braking. As the pedestrian continues to push faster on the door D, more current flows through the Zener diodes increasing the electrical load on the motor 76 acting as a generator and thereby increasing the braking torque force generated by the drive means 22 at its output shaft 40. When this torque or resistance to overspeeding exceeds the ninety inch pound slip torque force setting of the clutch 34, the clutch 34 slips and the motor 76 can be driven no faster than a safe speed.

At any sudden movement of the door D, as by a pedestrian abruptly banging against it, the clutch 34 may slip momentarily even before the drive means 22 can be appreciably speeded up, due to the internal friction as well as the well known inertial resistance of the drive means 22 to being used as a speed increaser for the motor 76, again protecting the drive means 22 from damaging shock loading. This condition may occur either when the door D is suddenly moved in the direction in which it is already being driven, or when it is moved suddenly from its stationary fully open position, unpowered, during the aforesaid time delay period.

If a pedestrian pushes the door D open while the motor 76 is trying to close it or pushes it closed when the motor is trying to open it, the clutch slips because the internal friction of the gear drive is added to the stalled torque force of the motor 76 to resist turning the drive means 22 in reverse of its powered driving direction, thereby creating a resisting torque force at the output shaft 40 of the drive means 22 significantly in excess of the stalled torque force exerted on the clutch 34 thereby and causing the clutch 34 to slip without driving the drive means 22 in reverse.

Tests on the drive means 22 indicate a torque force of about forty inch pounds is sufficient to stall the output shaft 40, and thereby the motor 76, while the motor 76 is powered and drawing its maximum current of about one ampere at four volts DC as limited by the resistor 134. Sinch the slip clutch 34 has been set to slip at ninety inch pounds torque force, the clutch 34 does not slip when the door D is driven fully closed against a stationary stop S, but the motor 76 stalls instead. Further tests indicate a break-away torque force requirement of 120 inch pounds at the output shaft 40 to start the unpowered motor 76 turning; therefore, a manual push or counterforce exerted to open the closed door D, or to close the door D when fully open during the aforesaid time delay period, will be resisted sufficiently by the resistive break-away force of the drive means 22 for slipping the clutch 34 without rotating the motor 76. Likewise, a sufficient counterforce exerted on the door D opposite or against the movement thereof, while it is being operated or moved under power, will first act through the clutch 34 to still the motor 76, and will then cause the clutch 34 to slip against the resistive break-away force of the drive means 22 without causing the drive means 22 to reverse.

While the preferred embodiment disclosed herein is taken from the working commercial product, it could be modified in numerous ways, as by different linkages, drive means, slip clutches, electrical components and circuits, and perhaps even by use of AC circuits and motor, and such alternate embodiments would not depart from the present inventive concept of an electrically powered door operator which normally acts continually to apply force in door closing direction, yet provides for powered opening and automatic closing of the door at a useful rate of speed upon signal, and also allows manual operation of the door in either direction at will (without damage to the operator) by means of a slip clutch between the door and the drive means therefor. The particular embodiment disclosed in full detail herein and illustrated in the drawings has been provided for disclosure purposes only and is not intended to limit the scope of the present invention, which is to be determined by the scope of the appended claims.

We claim:

1. An electrically driven operator for a door comprising a door operating linkage, electrically powered drive means connected to said linkage for applying an operating force to said door therethrough and capable of being continuously stalled while applying said operating force at the operating voltage of said drive means, slip clutch means connecting said drive means and said operating linkage for transmitting said operating force therebetween and having a resistance to slipping greater than the operating force of the drive means when stalled, and means for closing and maintaining the door in closed position against a stationary stop or obstruction by the application of the operating force with the drive means being continuously stalled by the obstruction without slipping of said clutch means.

2. A door operator according to claim 1 and characterized further in that said slip clutch means has a capability for slipping to allow movement of the door in the direction opposite the application of the operating force with the drive means continuously stalled upon application to said door of a counterforce sufficient to overcome said clutch means resistance.

3. A door operator according to claim 1 and characterized further in that said drive means is capable upon application of an overriding force of being oversped to an allowable limit and includes means acting at said limit for resisting overspeeding by loading said drive means to develop resistance to overspeeding sufficient to cause said clutch means to slip.

4. A door operator according to claim 2 and characterized further in that said drive means is capable upon application of an overriding force of being oversped to an allowable limit and includes means acting at said limit for resisting overspeeding by loading said drive means to develop resistance to overspeeding sufficient to cause said clutch means to slip.

5. A door operator according to claim 3 and characterized further in that said resistance to overspeeding is developed by means for electrically loading said drive means for developing therein said resistance to overspeeding.

6. A door operator according to claim 1 and characterized further by means actuated upon said door being opened to a predetermined location for removing electrical power from said drive means and for electrically loading said drive means for developing resistive force therein for overcoming said resistance to slipping of said clutch means by application of the inertial force of said door being opened to said clutch means against said resistive force, thereby decelerating the opening of said door by dissipation of said inertial force in said clutch means.

7. A door operator according to claims 2, 3, 4 or 5 and characterized further by means actuated upon said door being opened to a predetermined location for removing electrical power from said drive means and for electrically loading said drive means for developing resistive force therein for overcoming said resistance to slipping of said clutch means by application of the inertial force of said door being opened to said clutch means against said resistive force, thereby decelerating the opening of said door by dissipation of said inertial force in said clutch means.

8. A door operator according to claim 4 and characterized further in that said resistance to overspeeding is developed by means for electrically loading said drive means for developing therein said resistance to overspeeding and by means actuated upon said door being opened to a predetermined location for removing electrical power from said drive means and for electrically loading said drive means for developing resistive force therein for overcoming said resistance to slipping of said clutch means by application of the inertial force of said door being opened to said clutch means against said resistive force, thereby decelerating the opening of said door by dissipation of said inertial force in said clutch means.

9. A door operator according to claim 8 and characterized further in that said drive means is powered by a direct current electric motor.

10. A door operator according to claim 9 and characterized further in that said electric motor is a permanent magnet type motor.

11. A door operator according to claim 10 and characterized further in that said slip clutch means has surfaces for slipping comprising material containing polytetraflouroethylene.

12. A door operator according to claim 9 or 10 and characterized further in that said means for electrically loading said drive means for developing therein said resistance to overspeeding comprises a Zener diode connected to said motor.

13. A door operator according to claim 9 or 10 and characterized further in that said means for removing electrical power from said drive means and electrically loading said drive means for developing resistive force therein comprises a cam-actuated limit switch, normally closed contacts therein for opening and disconnecting said electrical power from said motor upon actuation of said switch, a loading resistor, and normally open contacts in said switch for closing and connecting said loading resistor to said motor.

14. A door operator according to claim 13 and characterized further by a bypass diode connected in parallel with said normally closed contacts for permitting electrical power to flow through said bypass diode to said direct current motor for closing said door from said predetermined location while said switch is actuated and said normally closed contacts are thereby opened.

15. A door operator according to claim 14 and characterized further by a blocking diode connected in series with said loading resistor for blocking said electrical power for closing said door from said predetermined location from said loading resistor while said switch is actuated and said normally open contacts are thereby closed.

16. A door operator according to claim 15 and characterized further by automatic means for reversing said power to said direct current motor after a time delay period allowing for said door to be opened to said predetermined location and said power to be disconnected from said motor by said actuation of said limit switch, said reversing of said power causing said door to be closed.

17. A door operator according to claim 8 and characterized further (a) in that said drive means is powered by a direct current electric motor;

(b) in that said electric motor is a permanent magnet type motor;

(c) in that said slip clutch means has surfaces for slipping comprising material free from stick-slip friction properties;

(d) in that said means for electrically loading said drive means for developing therein said resistance to overspeeding comprises a Zener diode connected to said motor;

(e) in that said means for removing electrical power from said drive means and electrically loading said drive means for developing resistive force therein comprises a cam-actuated limit switch, normally closed contacts therein for opening and disconnecting said electrical power from said motor upon actuation of said switch, a loading resistor, and normally open contacts in said switch for closing and connecting said loading resistor to said motor;

(f) by a bypass diode connected in parallel with said normally closed contacts for permitting electrical power to flow through said bypass diode to said direct current motor for closing said door from said predetermined location while said switch is actuated and said normally closed contacts are thereby opened;

(g) by a blocking diode connected in series with said loading resistor for blocking said electrical power for closing said door from said predetermined location from said loading resistor while said switch is actuated and said normally open contacts are thereby closed; and (h) by automatic means for reversing said power to said direct current motor after a time delay period allowing for said door to be opened to said predetermined location and said power to be disconnected from said motor by said actuation of said limit switch, said reversing of said power causing said door to be closed.

18. An electrically driven operator for a door according to claim 1 and characterized further in that said resistance to slipping is less than the sum of the internal friction of the drive means plus the operating force of the drive means when stalled.

19. An electrically driven operator for a door according to claim 1 and characterized further in that said slip clutch means has surfaces for slipping which are generally free of stick-slip frictional properties.

* * * * *

UNITED STATES PATENT OFFICE
CERTIFICATE OF CORRECTION

Patent No. 4,289,995 Dated Sept. 15, 1981

Inventor(s) Robert E. Sorber et al

It is certified that error appears in the above-identified patent and that said Letters Patent are hereby corrected as shown below:

Column 5, line 43, delete "slit" and insert therefor --split--. Column 6, line 10, delete "plage" and insert therefor --plate--. Column 6, line 27, delete "off" and insert --of--. Column 8, line 68, delete "Sinch" and insert therefor --Since--.

Signed and Sealed this

*Ninth* Day of *November 1982*

[SEAL]

*Attest:*

GERALD J. MOSSINGHOFF

*Attesting Officer* *Commissioner of Patents and Trademarks*